US009317961B2

(12) United States Patent
Kornmann

(10) Patent No.: US 9,317,961 B2
(45) Date of Patent: Apr. 19, 2016

(54) PRIORITIZING NODE REQUESTS BASED ON TILE DISTANCE TO REDUCE PERCEPTUAL SCENE TIME

(75) Inventor: David Kornmann, Tucson, AZ (US)

(73) Assignee: Google Inc., Mountain View, CA (US)

( * ) Notice: Subject to any disclaimer, the term of this patent is extended or adjusted under 35 U.S.C. 154(b) by 1234 days.

(21) Appl. No.: 13/232,481

(22) Filed: Sep. 14, 2011

(65) Prior Publication Data

US 2015/0170396 A1    Jun. 18, 2015

(51) Int. Cl.
*G06F 7/00*     (2006.01)
*G06T 15/00*    (2011.01)

(52) U.S. Cl.
CPC ..................... *G06T 15/005* (2013.01)

(58) Field of Classification Search
CPC ..................... G06F 17/30864; G06F 17/30867; G06F 17/30067; G06F 3/04815; G06F 12/0207; G06F 15/17387; G06F 15/17362; G06F 17/30333; G06F 2203/04802; G06T 15/005
USPC ........... 707/705, 797, 778, 789, 724, 999.003
See application file for complete search history.

(56) References Cited

U.S. PATENT DOCUMENTS 7,551,182 B2 *   6/2009   Bethune et al. ............... 345/619

FOREIGN PATENT DOCUMENTS

EP         1681656 A1 *    7/2006

OTHER PUBLICATIONS

Kim et al. (Performance Comparison of the R*-Tree and the QuadTree for kNN and Distance Join Queries, IEEE Transactions on Knowledge and Data Engineering, vol. 22, No. 7, Jul. 2010).*
Kim, You Jung, et al., "Performance Comparison of the {rm R}{ast}-Tree and the Quadtree for kNN and Distance Join Queries," in *IEEE Transactions on Knowledge and Data Engineering*, 22(7): 1014-1027, IEEE Educational Activities Department, United States (Jul. 2010).
Komzak, J., et al., "Scaleable GIS Data Transmission and Visualization," in *Proceedings of the Seventh International Conference on Information Visualization (IV '03)*, 230-236, IEEE Computer Society, United States (Jul. 2003).
Sardadi, Maruto Masserie, et al., "QuadR-Tree Indexing Selection Engine for Tuning Spatial Database System in Oil Well Production Data Transfer using Mobile Geographical Information System (GIS) Technology," in *New Advanced Technologies*, Aleksandar Lazinica (Ed.), InTech, United States (2010), 8 pages.

* cited by examiner

*Primary Examiner* — Mohammed R Uddin
(74) *Attorney, Agent, or Firm* — Dority & Manning, P.A.

(57) ABSTRACT

An exemplary method for reducing user-perceived scene resolution time to render a node tree in a three-dimensional environment includes identifying a first cache node in the node tree at a first level of detail. The exemplary method also includes computing a first priority score based at least on a depth in the node tree of the first level of detail and a first tile distance. The exemplary method further includes identifying a second cache node in the node tree at a second level of detail different from the first level of detail. The exemplary method also include computing a second priority score based at least on a depth in the node tree of the second level of detail and a second tile distance. The exemplary method further includes ordering cache node requests based at least on the relative values of the first and second priority scores.

22 Claims, 8 Drawing Sheets

Sorted by geographical distance, then level of detail

| 1111 | 111 | 1112 | 11 | 1121 | 112 | 1122 | 1 | 1211 | 121 | 1212 | 12 | 1221 | 122 | 1222 |
| 2111 | 211 | 2112 | 21 | 2121 | 212 | 2122 | 2 | 2211 | 221 | 2212 | 22 | 2221 | 222 | 2222 |

FIG. 3

Sorted by tile distance, then level of detail

| 1 | 11 | 111 | 1111 | 2 | 12 | 112 | 1112 | 1121 | 21 | 121 | 1121 | 1122 | 122 | 1122 | 211 |
|---|---|---|---|---|---|---|---|---|---|---|---|---|---|---|---|

| 1211 | 212 | 1212 | 221 | 1221 | 222 | 1222 | 2111 | 2112 | 2121 | 2122 | 2211 | 2212 | 2221 | 2222 |
|---|---|---|---|---|---|---|---|---|---|---|---|---|---|---|

FIG. 4A

Fetch order with tile distance based sort

| 1 | 2 |
|---|---|

| 11 | 12 | 21 | 22 |
|---|---|---|---|

| 111 | 112 | 121 | 122 | 211 | 212 | 221 | 222 |
|---|---|---|---|---|---|---|---|

| 1111 | 1112 | 1121 | 1122 | 1211 | 1212 | 1221 | 1222 | 2111 | 2112 | 2121 | 2122 | 2211 | 2212 | 2221 | 2222 |
|---|---|---|---|---|---|---|---|---|---|---|---|---|---|---|---|

FIG. 4B

PRIORITIZING NODE REQUESTS BASED ON TILE DISTANCE TO REDUCE PERCEPTUAL SCENE TIME

BACKGROUND

1. Field

This disclosure relates to geographic information systems (GIS) and in particular to data packet prioritization to render a three dimensional environment.

2. Background

A geographic information system (GIS) is a system for archiving, retrieving, displaying, or manipulating data indexed according to the data elements' geographic coordinates. The data elements may be a variety of data types such as, for example, satellite imagery, maps, models of buildings and terrain, and other geographic features.

GIS applications communicate with a server to retrieve data that is requested for display on a client device. A client may not be able to request all data that it needs from a server to resolve a view that satisfies a user because there is a maximum amount of data that the client may request from the server at any one time. Usability of GIS applications depends on displaying content quickly and smoothly.

BRIEF SUMMARY

Embodiments relate to methods for prioritizing data packets using tile distance to render a three dimensional environment. An exemplary method for reducing user-perceived scene resolution time to render a node tree in a three dimensional environment includes identifying a first cache node in the node tree at a first level of detail. The first cache node is located within a field of view of a virtual camera that defines a perspective to view content of the three-dimensional environment. The exemplary method also includes computing a first priority score based at least on a depth in the node tree of the first level of detail and a first number of tiles at the first level of detail between the first cache node and a location of the virtual camera in the three-dimensional environment. The exemplary method further includes identifying a second cache node in the node tree at a second level of detail different from the first level of detail. The second cache node is located within the field of view of the virtual camera. The exemplary method also includes computing a second priority score based at least on a depth in the node tree of the second level of detail and a second number of tiles at the second level of detail between the second cache node and the location of the virtual camera. The exemplary method further includes ordering cache node requests based at least on the relative values of the first and second priority scores.

Another exemplary method for reducing user-perceived scene resolution time to render a node tree in a three dimensional environment includes identifying a first cache node in the node tree at a first level of detail. The first cache node is located within a field of view of a virtual camera that defines a perspective to view content of the three-dimensional environment. The exemplary method also includes computing a first priority score based at least on a first number of tiles at the first level of detail between the first cache node and a location of the virtual camera in the three-dimensional environment. The exemplary method further includes identifying a second cache node in the node tree at a second level of detail different from the first level of detail. The second cache node is located within the field of view of the virtual camera. The exemplary method also includes computing a second priority score based at least on a second number of tiles at the second level of detail between the second cache node and the location of the virtual camera. The exemplary method further includes ordering cache node requests based at least on the relative values of the first and second priority scores.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

FIG. 3 shows a queue of tiles sorted by geographic distance and then level of detail.

FIG. 4A shows a queue of tiles sorted by tile distance and then level of detail.

FIG. 4B shows a fetch order based on a tile distance based sort.

DETAILED DESCRIPTION

Figure 1A:
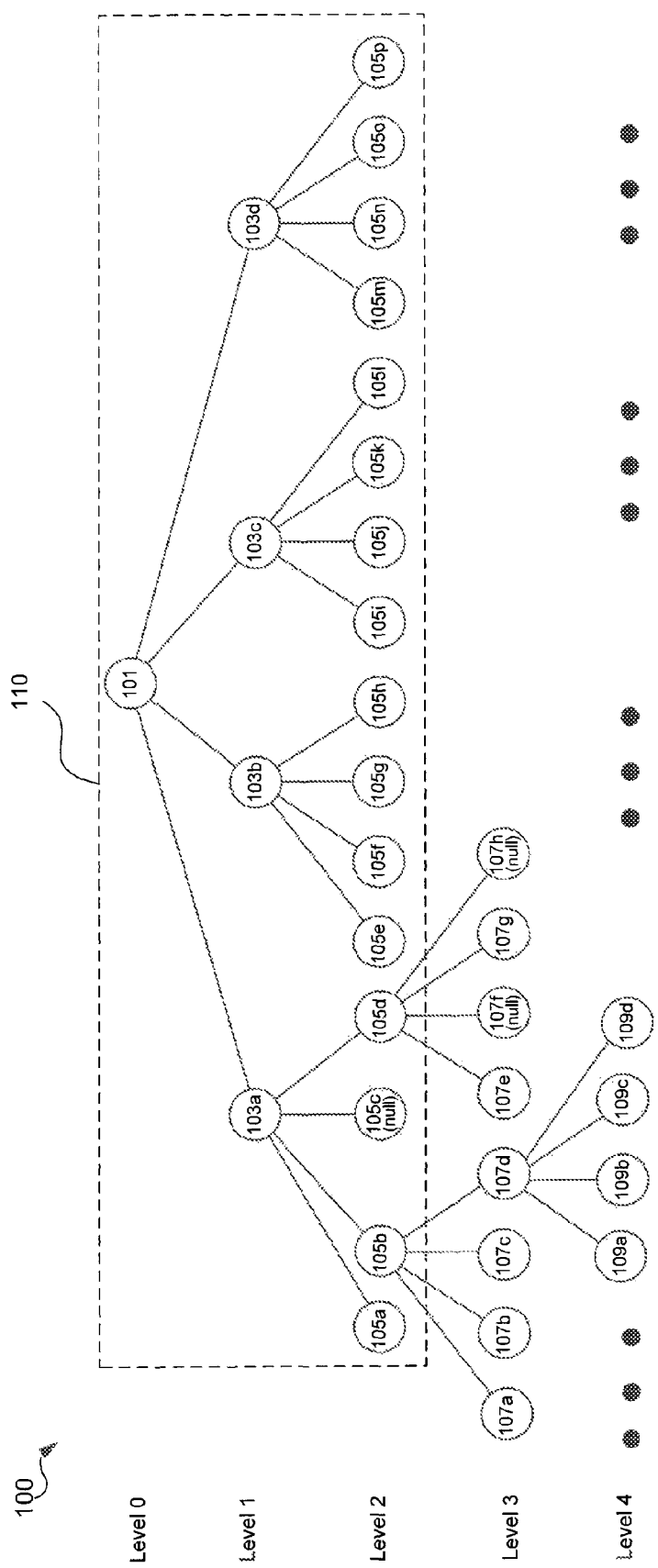
FIG. 1A shows an exemplary quadtree represented as a tree structure.

I. Overview
II. Quadtrees
  A. Tree Representation
  B. Grid Representation
III. Cache Node Priority Score
  A. Geographic Distance
  B. Tile Distance
  C. Cache Node Types
    1. Types of Cache Nodes
    2. Examples of Cache Node Constraints
    3. Offsets
  D. Primary and Secondary Factors
IV. Exemplary Client Architecture
V. Exemplary Method
VI. Conclusion

I. Overview

This description generally relates to data packet prioritization in a three-dimensional environment. A client may display a view of the planet by requesting cache nodes from a server and loading the cache nodes. In an embodiment, a client may order cache node requests before they are sent to a server based on a priority score associated with the cache node. The priority score indicates a priority of the cache node relative to other cache nodes. The cache nodes may be ordered such that data which visually matters to a user is fetched first. A priority score may be based on a tile distance instead of a geographical distance. Sorting cache nodes using a tile distance may have an advantage of different tiles being interleaved and requested. Sorting cache nodes using a geographic distance may not have this advantage.

A three dimensional view that is relevant to a user can be resolved without loading all the cache nodes to fully resolve the view. As a result, a user may have the perception that the scene is resolving faster. This may speed up scene resolution time and improve perceptual resolution quality.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Quadtrees

A. Tree Representation

Data associated with geographic information may be stored in a database characterized by a hierarchical data structure such as a quadtree structure. Quadtrees are composed of quad nodes and leaves. Quadtree nodes are elements which have children node descendants. Quadtree leaves, meanwhile, are node elements which have no children.

FIG. 1A shows an exemplary quadtree represented as a tree structure. In a quadtree 100, each parent node has exactly four children descendants. A root node 101 has exactly four children, 103a-103d. Each node at level of detail 1 also has four children, as shown at level of detail 2. Each level of a quadtree possesses four times as many nodes as its previous level.

A node is a data structure that may point to a payload of data and up to four references to other files, each of which in turn may be a quad node. In some instances, the payload of data is empty. Each of the references to other files includes, for instance, a filename and a corresponding address in local memory for that file, if any. The files referenced by a quad node are referred to as the children of that quad node, and the referencing quad node is referred to as the parent. In some cases, a file contains not only the referenced child, but descendants of that child as well. These aggregates are known as cache nodes and may include several quad nodes. Such aggregation takes place in the course of database construction.

Cache nodes may represent pieces of data that the client needs to resolve the current three dimensional view. Each cache node request may be grouped into smaller aggregate groups when the data to be retrieved from a server are larger in size (e.g., image tiles) and may be grouped into larger aggregate groups when the data to be retrieved from the server are smaller in size (e.g., geographic data points). In this way, a size of the aggregated cache node requests can be modified based on the type of data to be retrieved from the server.

Nodes in a cache node may reference nodes in the same cache node or in different cache nodes. For example, a leaf node in a cache node may have references to another cluster of nodes that are subdivisions of that particular leaf node. Each leaf node in a cache node may have different children nodes that are located in different cache nodes. In an example, a leaf node in a cache tree may reference a unique identifier of a cache node that contains the children of the leaf node. The unique identifier is used to fetch the cache node that has the children of that particular leaf node. The unique identifier indicates which cache node to fetch from a server. The unique identifier may be an serial number, pointer, or other unique reference to a cache node. In an embodiment, a leaf node in a cache node is a root node in another cache node. In another embodiment, a leaf node in a cache node references a root node in another cache node.

In an embodiment, cache nodes are identified in a node tree at particular levels of detail. Multiple cache nodes may be triggered by multiple leaf nodes in a cache tree. A level of detail of a cache node may be the level in a quad tree in which a root of the cache node is triggered. For example, in FIG. 1A, if node 105b in cache node 110 is a root node of a different cache node, the level of the second cache node is level 2.

The cache nodes may be located within a field of view of a virtual camera that defines a perspective to view content of the three-dimensional environment. A client may request cache node 110, which may be within a field of view of the virtual camera. Cache node 110 includes root node 101, its four children, 103a-103d, and their respective children, 105a-105p. Children 105a-105p are leaf nodes in cache node 110 and may have references to other nodes. For example, node 105b is a leaf node in cache node 110 and is also a root node in a different cache node. Leaf node 105b references children nodes 107a-107d, which may also have children nodes. Similarly, node 105d is a leaf node in cache node 110 and is also a root node in a different cache node. Leaf node 105d references children nodes 107e-107h, which may also have children nodes.

Both nodes and leaves may contain various types of data. The data may be stored in rows of a database. In the quadtree structure, each row of the database may be represented as a node or leaf Each node may represent a database row for a region of land, and may also contain information related to the children of that node.

Quadtrees may be used in conjunction with a two-dimensional map. Such quadtrees may be used to divide a two-dimensional map into four partitions, and sub-divide the created partitions further depending on the data contained in the two-dimensional map.

In an embodiment, a quadtree is used to partition a surface of the Earth into subregions. Each subregion may be bounded by latitude and longitude values. Displaying views of the Earth include requesting and loading cache nodes.

B. Grid Representation

Figure 1B:
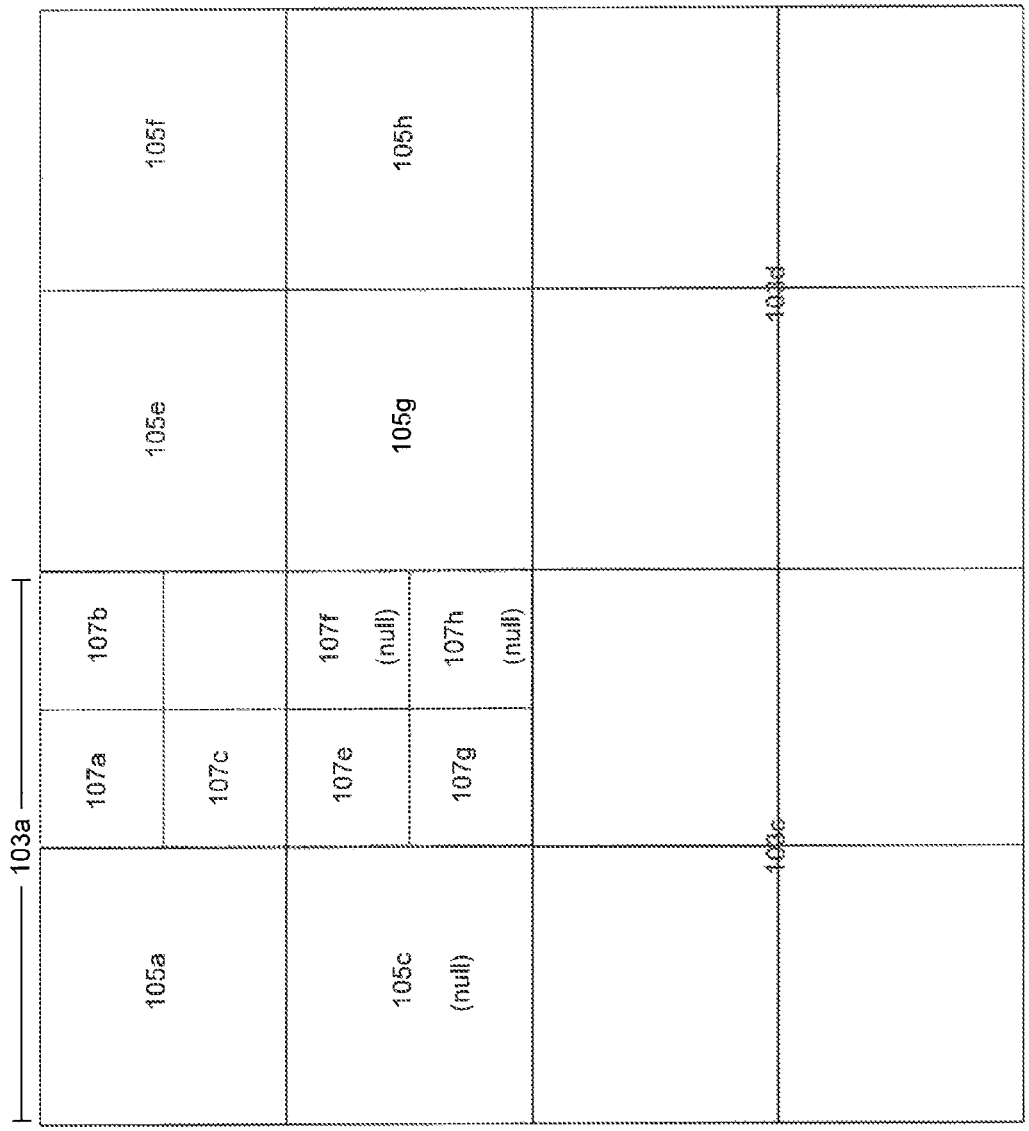
FIG. 1B shows an exemplary quadtree represented as a grid.

FIG. 1B shows an example of a grid-type quadtree. In the grid representation of a quadtree, the root node is the node covering all data in the quadtree, represented by the overall square 101 in FIG. 1B. The first level of child nodes may be represented by the dashed lines forming four square partitions 103a-103d of the root node, which equally divide the root node. Each first level child node may then itself be divided into four children, which may also be divided into four children. Nodes that have not been further divided are known as leaf nodes. Nodes and leaves may also be known as tiles, owing to their square shape. Each node and leaf is represented with a row in a database. The grid and tree quadtree representations may store identical information. For example, FIGS. 1A and 1B represent the same quadtree, one in grid form and one in tree form.

Searching for data in a particular desired node in a quadtree data structure may first start at the root node of the quadtree. Based on the data in the root node, ancestor nodes of the desired node are determined. Traversing the quadtree may require finding each ancestor node covering the desired node, until the desired node is reached. In the grid example, locating a particular node would entail starting at the root node or square covering all nodes, then progressively determining the various smaller nodes covering the desired node. For example, finding node 105h of FIG. 1A, in the best-case scenario, may require four database lookups for a quadtree stored in a database. Similarly, in the grid representation, one traverses the overall or root node, then each child node until reaching the leaf node with the data of the point desired.

Figure 2:
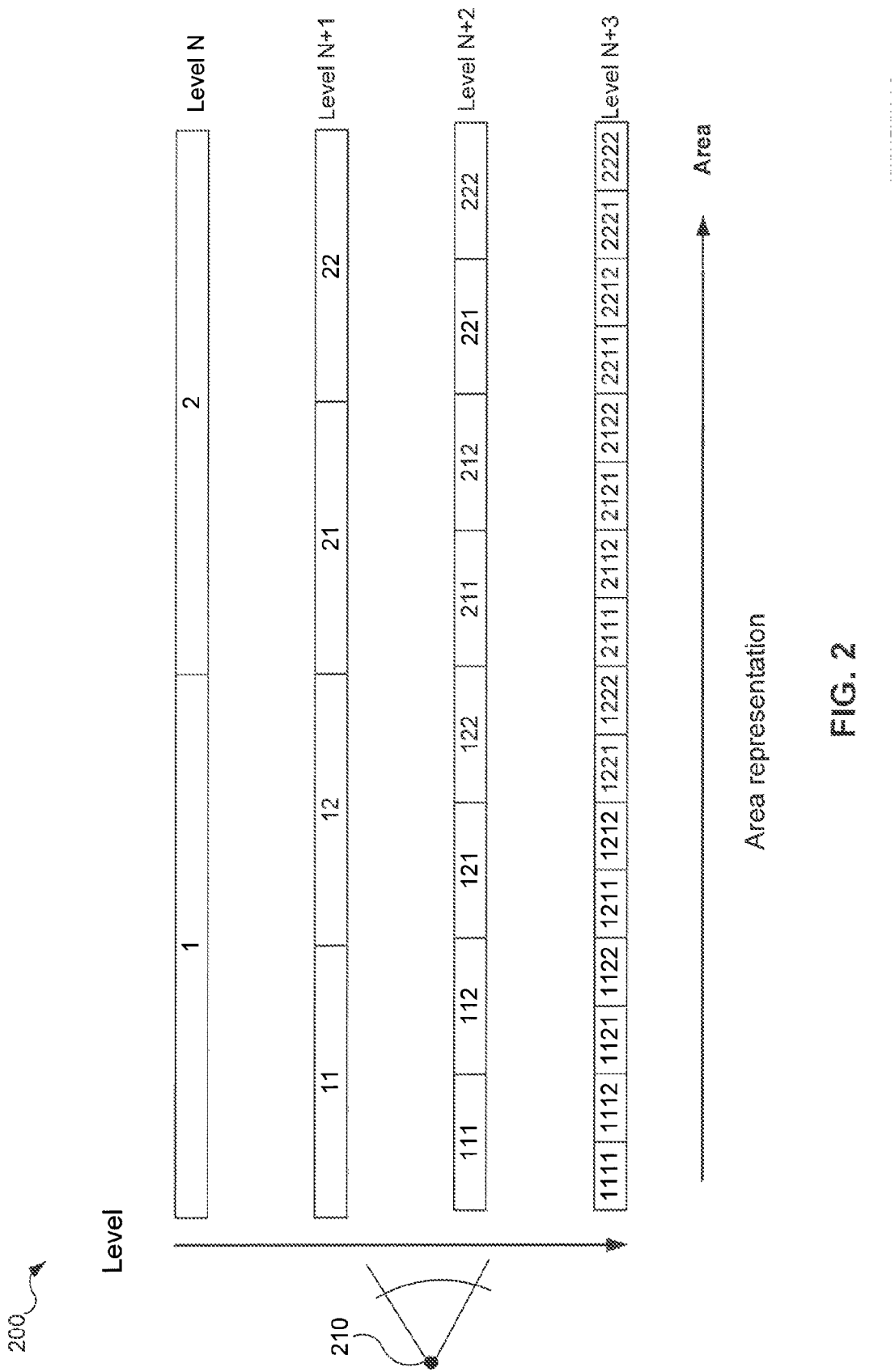
FIG. 2 shows a graph that displays an area representation of a quadtree.

FIG. 2 shows a graph 200 that displays an area representation of a quadtree. Each level of the tree covers the same partitioning area. For example, the tiles at level N cover the same partitioning area as the tiles at level N+1, level N+2, and level N+3. Further, each tile at each subsequent level covers a smaller partitioning area. For example, each tile at level N+3 covers a smaller partitioning area than each tile at level N+2, each tile at level N+2 covers a smaller partitioning area than each tile at level N+1, and each tile at level N+1 covers a smaller partitioning area than the tiles at level N. Nodes at level N+3 have a deeper depth than nodes at levels N, N+1, and N+2.

III. Cache Node Priority Score

For each frame, a GIS may gather a list of cache nodes that the GIS wishes to access. A priority score may be computed for a cache node, the cache node requests may be ordered and streamed based on the relative values of the priority scores. A cache node having a higher priority is requested before a cache node having a lower priority. When cache nodes types are streamed based on the relative values of the priority scores, user-perceived scene resolution time is reduced.

In an embodiment, a priority score of a cache node is based on a tile distance, cache node type, and a level of a cache node. For example, in an embodiment, a cache node is identified in a node tree at a level of detail. The first cache node may be located within a field of view of a virtual camera that defines a perspective to view content of the three-dimensional environment. A priority score is computed based at least on a depth in the node tree of the level of detail and a tile distance.

In an embodiment, a priority value of 0 indicates highest priority and priority values of 1, 2, 3, and so on indicate lower priorities. It is to be appreciated that cache nodes may also be sorted in increasing values of priority.

A. Geographic Distance

This section describes the generation of a priority score based on geographic distance. This is in contrast to the generation of a priority score based on tile distance as described below.

A priority score is based on a geographic distance between a cache node and a focus point 210 of a virtual camera. Geographic coverage of nodes in a node tree may be calculated, and the nodes sorted based on geographic distance.

In an embodiment, a geographic distance may be a distance between focus point 210 and a center of a region controlled by the cache node. A geographic distance between focus point 210 and a center of tile 1 is less than a geographic distance between focus point 210 and a center of tile 2. Accordingly, tile 1 is geographically closer to focus point 210 than tile 2. Similarly, a geographic distance between focus point 210 and a center of tile 111 is less than a geographic distance between focus point 210 and a center of tile 11. Accordingly, tile 111 is geographically closer to focus point 210 than tile 11. In FIG. 2, tile 1111 is the geographically closest tile to focus point 210, followed by tile 111, 1112, and so on.

FIG. 3 shows a queue of the tiles in FIG. 2 sorted by geographic distance and then level of detail. The queue shows different tiles may be fetched. Tiles associated with tile 1 (e.g., tiles 1111, 111, and 1112) are requested first in the queue. Tiles associated with tile 2 (e.g., 2111, 211, and 2112) are requested after tiles associated with tile 1 are requested.

Notably, tiles 1 and 2 are not interleaved in the queue. As a result, all tiles associated with tile 1, for example, up to a particular level of detail, are requested before any tiles associated with tile 2 are requested. This may take longer to render a view that satisfies a user.

B. Tile Distance

In an embodiment, a priority score is based on a tile distance of a cache node. A tile distance may be a number of tiles at a particular level of detail between the cache node and a location of the virtual camera in the three dimensional environment. The tile distance may be a geographic distance normalized to tile units for a level of detail in the node tree. Moreover, the tile distance may only include the component along the surface of the model. The level of detail may correspond to a location of the cache node in the node tree. Using the tile distance to order cache nodes may balance the loading of cache nodes across different levels of detail. Cache nodes which are located close to a user's area of interest may be favored and requested for streaming. Cache nodes from other levels of detail are also loaded and streamed in a view coherent fashion.

In FIG. 2, tiles 1 and 2 are at level N. Tile 1 may be considered 0 tile distances from focus point 210, and tile 2 may be considered 1 tile distance from focus point 210. Accordingly, based on tile distance, tile 1 is closer to focus point 210 than tile 2. Tiles 11, 12, 21, and 22 are at level N+1. Tile 11 may be considered 0 tile distances from focus point 210, tile 12 may be considered 1 tile distance from focus point

210, tile 21 may be considered 2 tile distances from focus point 210, and tile 22 may be considered 3 tile distances from focus point 210. Accordingly, based on tile distance, tile 11 is closer to focus point 210 than tiles 12, 21, and 22.

FIG. 4A shows a queue of the tiles in FIG. 2 sorted by tile distance and then level of detail. When tiles are sorted based on tile distance and then level of detail, the queue shows an interleaving between tile distance and level of detail. For example, tiles associated with tile 1 are interleaved among tiles associated with tile 2. Tiles 1, 11, 111, and 1111 are fetched. After tile 1111 is fetched, tile 2 is in the queue and is interleaved along with the geographic area of tile 1.

An interleaving of tile distance and various levels of detail may allow a user to see a view in which a close range includes fine details and a far range includes coarse details, with a progressive degradation of a level of detail function of the distance of the focus point.

FIG. 4B shows a fetch order based on a tile distance based sort. In an embodiment, tiles 1111, 111, 11, and 1 are fetched first. Tiles 1112, 112, 12, and 2 are fetched after tiles 1111, 111, 11, and 1. Tiles 1121, 121, and 21 are fetched after tiles 1112, 112, 12, and 2. Tiles 1122, 122, and 22 are fetched after tiles 1121, 121, and 21, and so on.

Cache nodes of different types may be sorted based on the tile distances. In an embodiment, tile distances are determined for cache nodes of a first type and a second type different from the first type. The tiles of these different cache node types may be interleaved based on tile distances and levels of detail of the cache nodes.

C. Cache Node Types

In an embodiment, a priority score is also based on a type of the cache node in addition to the tile distance. A database may include a set of cache nodes of different types. The cache node type can be used to favor loading a specific type of data over another. Each cache node type has a priority function that is used to calculate the priority score of the cache node.

Nonlimiting examples of cache nodes are quadtree, imagery, terrain, drawable, and artificial structure cache nodes. Each of these cache node types may have specific properties and streaming requirements that are taken into account to achieve optimal streaming performance.

1. Types of Cache Nodes

Quadtree cache nodes contain the backbone of the database and are typically small in size and cheap to process. In an embodiment, for a frame, quadtree cache nodes are streamed first before other cache nodes. Each quadtree cache node contains a cluster of several levels of quad nodes. In an embodiment, there may be up to four levels of quad nodes per cluster. Quadtree cache nodes are typically streamed from the root quadtree level down to the finest level of detail. In an embodiment, quadtree cache nodes that belong to the same level in the quadtree are sorted by tile distance.

Imagery cache nodes contain the ground imagery of the database and may exist at every level of the quadtree. Imagery cache nodes may include two dimensional imagery information. These cache nodes tend to be expensive to process when they come from the network because of the re-compression of the tiles. Imagery cache nodes may be loaded based on a function of the geometry tiles that need to be rendered and the need to match texture with screen pixels. Imagery tiles typically do not map a subset of a geometry tile. Accordingly, failing to have the correct terrain level of detail in view may cause coarser texture levels to be loaded first. Typically, imagery cache nodes are largely responsible for the perception of refinement of the three dimensional view. Imagery cache nodes may be separated into two categories. The first category is the imagery cache nodes that directly contribute to the immediate resolution of the three dimensional view, and the second category is the imagery cache nodes that may be needed if the user decides to zoom out.

Terrain cache nodes contain the surface geometry of the database. For example, the terrain cached nodes may model the terrain of the Earth. In this way, terrain cache nodes include three-dimensional model information. These cache nodes may exist at every even level of the quadtree, and contain 20 meshes each, 4 per quad node. Typically, terrain cache nodes moderately contribute to the perceptual refinement of the three dimensional view. Beyond a certain level of detail, new terrain tiles may contribute less and less to the perceptual refinement because they are bringing ever smaller details to the view. Accordingly, favoring the loading of terrain cache nodes too much may introduce a perception of latency with the refinement. Terrain cache nodes may be separated into two categories. The first category is the terrain cache nodes that directly contribute to the immediate resolution of the three dimensional view, and the second category is the terrain cache nodes that may be needed if the user decides to zoom out. When rendering a view of a planet, loading terrain cache nodes from fine to coarse may cause visual artifacts, like major cracks, on the surface of the planet.

Drawable cache nodes contain the vector overlays of the database and may exist at every level of the quadtree. These cache nodes can be fairly large when a lot of data is associated with them but are usually small and cheap to process. Vector overlays are generally a collection of latitude and longitude information with formatting connection and label information. Because vector overlays may lack altitude information, it may be two-dimensional data that needs to be rendered on top of terrain information. Because drawable cache nodes contain vector overlays, the drawables are updated every time the terrain changes. Accordingly, it may be more efficient to load drawable cache nodes once the terrain surface refinement is stable. Additionally, this may free a significant amount of unnecessary processing that can be used to improve the scene resolution time by increasing the cache nodes' processing speed. Drawable cache nodes can account for more than 50 percent of the cache nodes streamed for a given view, and typically contribute little to the perceptual refinement of the three dimensional view. Accordingly, loading drawable cache nodes early on may introduce a perception of latency with the refinement.

Drawable cache nodes may be separated into two categories. The first category is the drawable cache nodes that belong to layers having levels of detail (e.g., roads and borders). For cache nodes belonging to the first category, drawable cache nodes are loaded from the finest level to the coarsest level because the resolution that is closest to the view matters. Loading the cache nodes from lower to higher levels may lead to rendering artifacts like fat roads but may give a user the feeling that the view is refining more quickly.

The second category is the drawable cache nodes that belong to layers not having levels of detail (e.g., sites). For cache nodes belonging to the second category, the level at which the drawables are stored may be a function of their ranking. The higher the rank of drawables, the closer to the root of the quadtree they are stored. Drawable cache nodes belonging to the second category are loaded from the coarsest level down to the finest level.

In an embodiment, drawable cache nodes belonging to the first and second categories can be differentiated. A first priority function may be applied to drawable cache nodes belonging to the first category, and a second priority function may be applied to drawable cache nodes belonging to the second category. In an embodiment, the first priority function is different from the second priority function. In another embodiment, the first priority function is the same as the second priority function.

Artificial structure cache nodes contain the building and culture geometries (e.g., trees, fences, and road signs) of the database. These cache nodes are typically human-made structures that are placed on a surface (e.g., terrain). In one example, an artificial structure cache node may contain building data. If the building data is requested before the terrain data, time and computational resources may be wasted because the building data was requested too early and may need to be reprocessed after the terrain data is processed and streamed.

Artificial structure cache nodes can be separated into two types of cache nodes. The first type of artificial structure cache node is a meta cache node. Meta cache nodes contain information about the structure of a scene graph of a city block or a particular structure. Typically, meta cache nodes are lightweight and can be loaded early. Loading meta cache nodes too early, however, may trigger the loading of data cache nodes, which are heavier to load and process than meta cache nodes.

The second type of artificial structure cache node is a data cache node. Data cache nodes contain the geometry and textures needed by the scene graph and are typically heavy weight cache nodes. These cache nodes can be very large (e.g., 1 MB) and expensive to process because of the re-compression of the tiles. In an embodiment, data cache nodes are pre-sorted by artificial structure based on view dependent three dimensional requirements and the data cache nodes remain streamed in that order. Typically, data cache nodes are not streamed before meta cache nodes.

2. Examples of Cache Node Constraints

Streaming one type of node before another type of node may improve user-perceived scene resolution time. Computing priority scores based on a cache node type can ensure that a first cache node type (e.g., quadtree cache node) for a given level of detail in the database hierarchy will be streamed before a second cache node type (e.g., terrain cache node). In an embodiment, a first cache node type (e.g., imagery cache node) may overlap a second cache node type (e.g., terrain cache node) for a same level of priority.

In one example, when the terrain in a view changes, the vector overlays are recomputed to adjust to the updated terrain. If a client streams vector overlays, for example roads, before the updated terrain cache nodes are streamed, the roads may be seen going through the ground or floating in the air because the terrain cache nodes have not yet been streamed. In this case, the vector overlays (e.g., roads) will be recomputed after streaming the updated terrain. If the updated terrain is not streamed by the time the vector overlays are loaded, then the amount of time that elapses to resolve a given three dimensional view may be unsatisfactory to a user. The client incurs penalties, such as unnecessary CPU computation and unnecessary processing and bandwidth to stream. In an embodiment, a priority score of a terrain cache node may typically indicate a higher priority than, for example, drawable cache nodes such that terrain cache nodes are typically requested before drawable cache nodes.

As described, quadtree cache nodes are the backbone of the database and are typically the first cache nodes to be streamed in a frame. In an embodiment, a priority score of a quadtree cache node may typically indicate a higher priority than the other cache nodes such that quadtree cache nodes are typically loaded before other cache nodes.

As described, drawable cache nodes are typically dependent on other cache nodes already being rendered. In an embodiment, a priority score of a drawable cache node may typically indicate a lower priority than other cache nodes such that drawable cache nodes are typically loaded after other cache nodes have been loaded.

3. Offsets

An offset can be applied to a priority score based on various factors such as a depth in a node tree of a particular level of detail in which the cache node is located, cache node type, and tile distance. The priority scores of cache nodes may be offset such that certain types of cache nodes are requested before others. A bias can be applied to each class of data such that different classes of data are interleaved and requested at an appropriate point in the streaming process. Applying an offset may interleave requests for different types of cache nodes in a queue. For example, the level of detail may shift a priority score by the equivalent of one level of detail across different types of cache nodes.

In an embodiment, terrain data that is closest to a user's selection may be requested first and then the imagery data that is closest to the user's selection may be requested, and so on. An offset can be applied to the computed priority scores of the terrain cache nodes and imagery cache nodes. The offset can indicate that, for example, tile 1 of an imagery cache node is fetched after tile 111 of a terrain cache node is fetched. All the terrain data for a frame are not requested before the imagery data.

In one example, a quadtree cache node has the queue shown in FIG. 4A, and a terrain cache node has the queue shown in FIG. 4A. For each node type, if tile 1 has a priority score of 0 and tile 2222 has a priority score of 24, tile 2222 would be the last tile to be requested. If the quadtree and terrain cache nodes have priorities ranging from 0-24, to ensure that, for example, quadtree cache nodes are requested before terrain cache nodes, an offset can be applied to the terrain cache nodes. In one example, an offset of 12 is applied to the terrain cache nodes. In this example, a priority score range for the terrain tiles is 12-36. Accordingly, quadtree cache nodes would be requested according to the queue in FIG. 4A (e.g., tiles 1, 11, 111, and so on for quadtree cache nodes), and at a point in the streaming process, terrain cache nodes would be requested according to the queue in FIG. 4A (e.g., tiles 1, 11, 111, and so on for terrain cache nodes). The requests for quadtree cache nodes would be interleaved with requests for terrain cache nodes.

In an embodiment, priority scores are offset such that cache nodes tend to be requested in the following order: quadtree cache nodes, imagery cache nodes, terrain cache nodes, artificial structure cache nodes, and drawables cache nodes. In an embodiment, an offset of a quadtree cache node is 0, an offset of an imagery cache node is 1, an offset of a terrain cache node is 2, an offset of a meta cache node type is 3, an offset of a vector cache node is 4, and an offset of a data cache node is 4. Higher offsets associated with a cache node may indicate that the cache node is more expensive to compute, load, process, or fetch. Cache nodes associated with higher offsets are typically loaded after other cache nodes have already been loaded. Accordingly, more complicated tiles may be streamed without affecting a user's satisfaction in the scene view.

D. Primary and Secondary Factors

The priority function may include a primary factor and a secondary factor that is used to calculate the priority score. The primary factor may be based on an arbitrary value that is a function of the cache node type. The secondary factor separates cache nodes that have the same primary factor.

Figure 5:
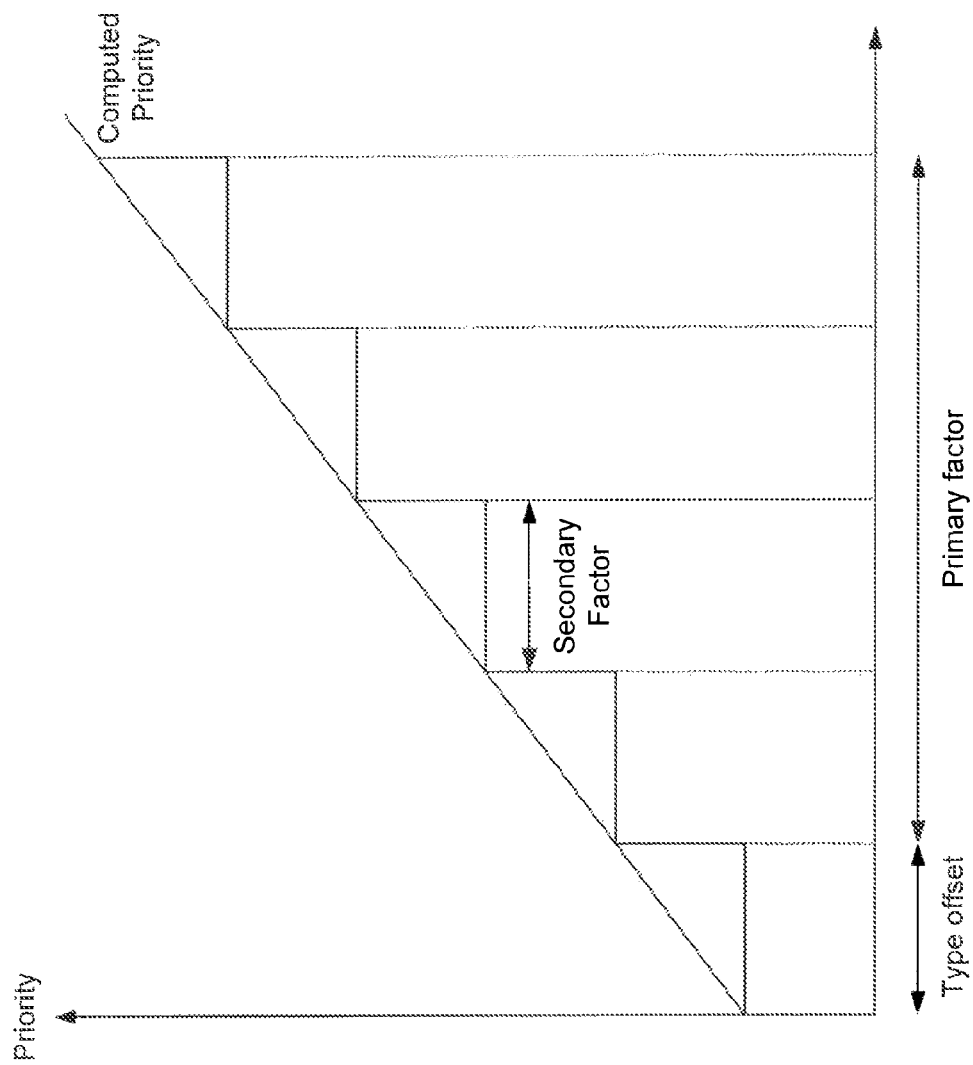
FIG. 5 shows a graph that displays a computed priority as a function of a primary factor, second factor, and offset.

FIG. 5 shows a graph that displays a computed priority as a function of a primary factor, secondary factor, and offset.

In an embodiment, a priority score of a quadtree cache node is based on a level of detail of the cache node and a tile distance. The level in ascending order may be the primary factor, and the tile distance may be the secondary factor. The level may be divided by a fixed number to slow down the progression of the quadtree priority function of the cache level to ensure that the quadtree cache nodes are loaded first.

In an embodiment, a priority score of an imagery cache node is based on a level of detail of the cache node and a tile distance. The tile distance may be the primary factor, and the level of detail may be the secondary factor. This ordering may privilege loading the texture data that are in close range over the texture data that are farther away.

In an embodiment, a priority score of a terrain cache node is based on a level of detail of the cache node and a tile distance. The tile distance may be the primary factor, and the level in ascending order may be the secondary factor relative to the minimum level in which terrain is found.

In an embodiment, a priority score of a drawable cache node that has levels of detail is based on a level of detail of the cache node and a tile distance. The level in descending order relative to the maximum level in which drawable cache nodes are found may be the primary factor, and the tile distance may be the secondary factor. If this is used, roads at the finest level of detail may be one of the first objects to appear in a view.

In an embodiment, a priority score of a drawable cache node that does not have levels of detail is based on a level of detail of the cache node and a tile distance. The level in ascending order may be the primary factor, and the tile distance may be the secondary factor. If this is used, points of interest with high rankings may be one of the first objects to appear in a view.

In an embodiment, a priority score of an artificial structure cache node is based on a counter. The bits of the counter are offset between the primary factor and the secondary factor. This may change the slope of the priority function.

IV. Exemplary Client Architecture

Figure 6:
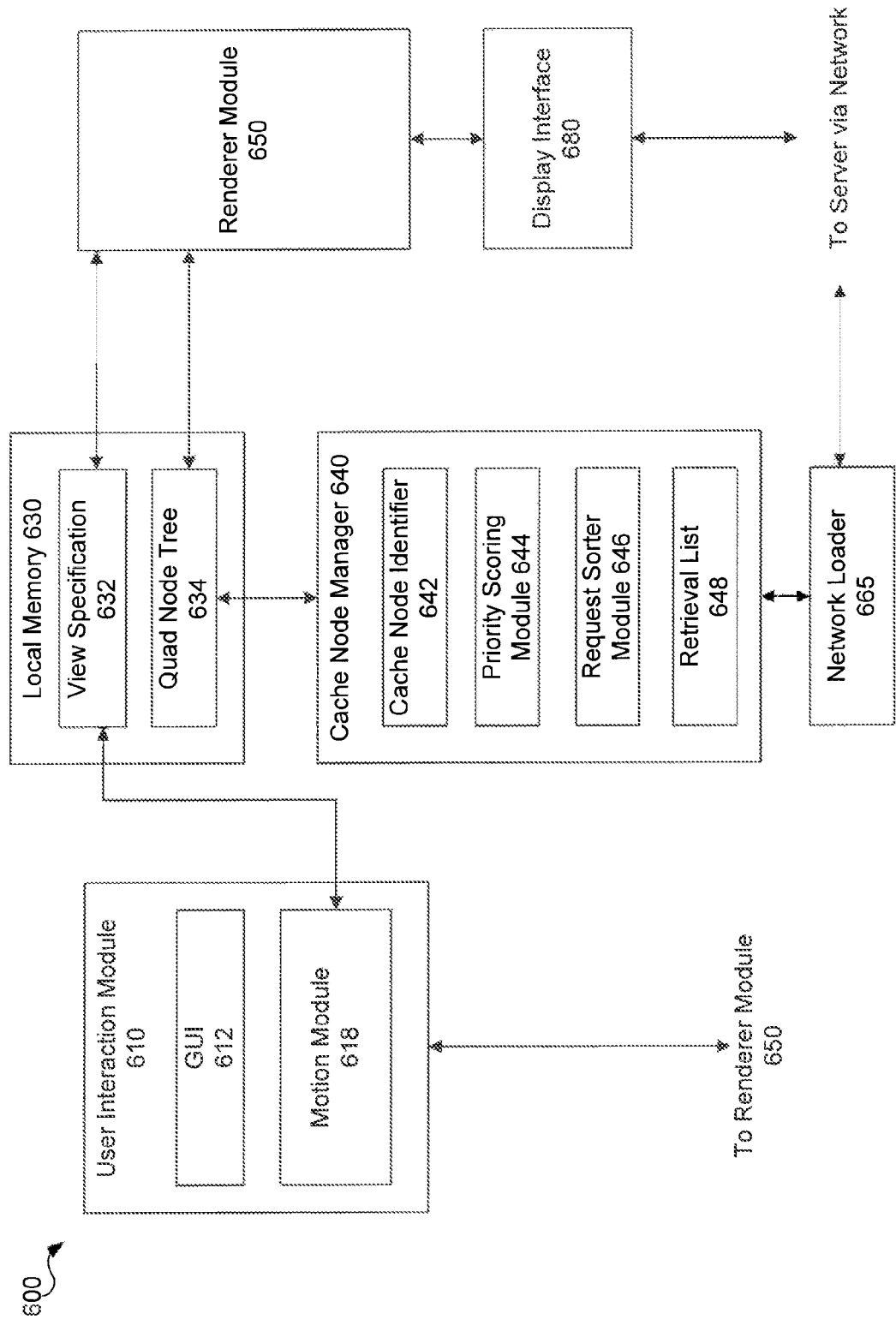
FIG. 6 shows an architecture diagram of an exemplary client of a GIS, according to an embodiment.

FIG. 6 shows an architecture diagram of an exemplary client 600 of a GIS, according to an embodiment. In an embodiment, client 600 includes a uses interaction module 610, local memory 630, cache node manager 640, renderer module 650, network loader 665, and display interface 680.

In an embodiment, the components of client 600 can be implemented, for example, as software running on a client machine. Client 600 interacts with a GIS server (not shown) to bring images of the Earth and other geospatial data to client 600 for viewing by a user. Together, the images of the Earth and other geospatial data form a three dimensional model in a three dimensional environment. In an embodiment, software objects are grouped according to functions that can run asynchronously (e.g., time independently) from one another.

User interaction module 610 includes a graphical user interface (GUI) 612 and motion module 618. Local memory 630 includes a view specification 632 and quad node tree 634.

In an embodiment, client 600 operates as follows. User interaction module 610 receives user input regarding a location that a user desires to view and, through motion module 618, constructs view specification 632. In an embodiment, a user inputs location information using GUI 612. This results, for example, in the generation of view specification 632. View specification 632 defines a virtual camera's viewable volume within a three dimensional space, known as a frustum, and the position and orientation of the frustum with respect, for example, to a three dimensional map. View specification 632 is placed in local memory 630, where it is used by renderer module 650. In an embodiment, renderer module 650 uses view specification 632 to render data for display.

In an embodiment, cache node manager 640 builds a quad node tree 634 by populating it with quad nodes based on view specification 632. In an embodiment, cache node manager 640 identifies which cache nodes are needed from the server to resolve a review and requests these cache nodes.

Cache node manager 640 includes cache node identifier 642, priority scoring module 644, request sorter module 646, and retrieval list 648.

Cache node identifier 642 identifies cache nodes in a node tree at a particular level of detail. The identified cache nodes may be needed to resolve a view and may be located within a field of view of a virtual camera that defines a perspective to view content of the three-dimensional environment. In an embodiment, cache node identifier 642 determines a type of a cache node. A type can be a quadtree, imagery, terrain, or drawable cache node type. For example, cache node identifier 642 may determine that a first cache node is of a quadtree cache node type and may determine that a second cache node is of a terrain cache node type.

Priority scoring module 644 computes priority scores of the cache nodes based on various factors. For example, priority scoring module 644 may compute a priority score for a cache node based at least on a depth in the node tree of a first level of detail of the cache node and a first number of tiles at the first level of detail between the cache node and a location of the virtual camera in the three dimensional environment.

Priority scoring module 644 may compute the priority scores using primary and second factors. In an embodiment, priority scoring module 644 may compute a priority score using a tile distance as a primary factor and a level of detail as a secondary factor. In another embodiment, priority scoring module 644 may compute a priority score using a level of detail as a primary factor and a tile distance as a secondary factor.

As described above, each cache node type may have a priority function that is used to calculate the priority score of the cache node. Priority scoring module 644 may apply a first priority function to a cache node of a first type and may apply a second priority function, different from the first priority function, to the cache node of the second type.

In an embodiment, priority scoring module applies a first offset to a priority score of a first cache node type, and applies a second offset to a priority score of a second cache node type different from the first cache node type. The offset may be used to prioritize cache nodes such that those cache nodes that are more important for a user to view are displayed before other cache nodes.

Request sorter module 646 orders cache node requests based at least on relative values of the priority scores computed by priority scoring module 644. Request sorter module 646 may also request the cache nodes based on the order of the cache nodes. In one example, when a first priority score indicates a higher priority than a second priority score, request sorter module 646 orders the cache node requests such that the cache node associated with the first priority score is requested before the cache node associated with the second priority score. Client 600 may stream content of the cache nodes based at least on the relative values of the first and second priority scores process. For example. Client 600 may stream the cache node associated with the first priority score before the cache node associated with the second priority score.

In another example, when the second priority score indicates a higher priority than the first priority score, request sorter module 646 orders the cache node requests such that the cache node associated with the second priority score is requested before the cache node associated with the first priority score. Client 600 may stream the cache node associated with the second priority score before the cache node associated with the first priority score.

Retrieval list 648 includes a list of information identifying cache nodes to be requested and downloaded from a GIS server. Cache node manager 640 builds quad node tree 634 in local memory 630 by populating it with quad nodes retrieved from GIS server(s).

In each network loader 665 thread, a network loader traverses cache node retrieval list 648 and requests the next cache node from the GIS server(s) using the cache node's filename. Network loader 665 only requests files that appear on the cache node retrieval list. Cache node manager 640 allocates space in local memory 630 (or other suitable storage facility) for the returned file, which is organized into one or more new quad nodes that are descendants of the parent quad node.

Cache node manager 640 can also decrypt or decompress the data file returned from the GIS server(s), if necessary (e.g., to complement any encryption or compression on the server-side). Cache node manager 640 updates the parent quad node in quad node tree 634 with the address corresponding to the local memory 630 address for each newly constructed child quad node.

V. Exemplary Method

Figure 7:
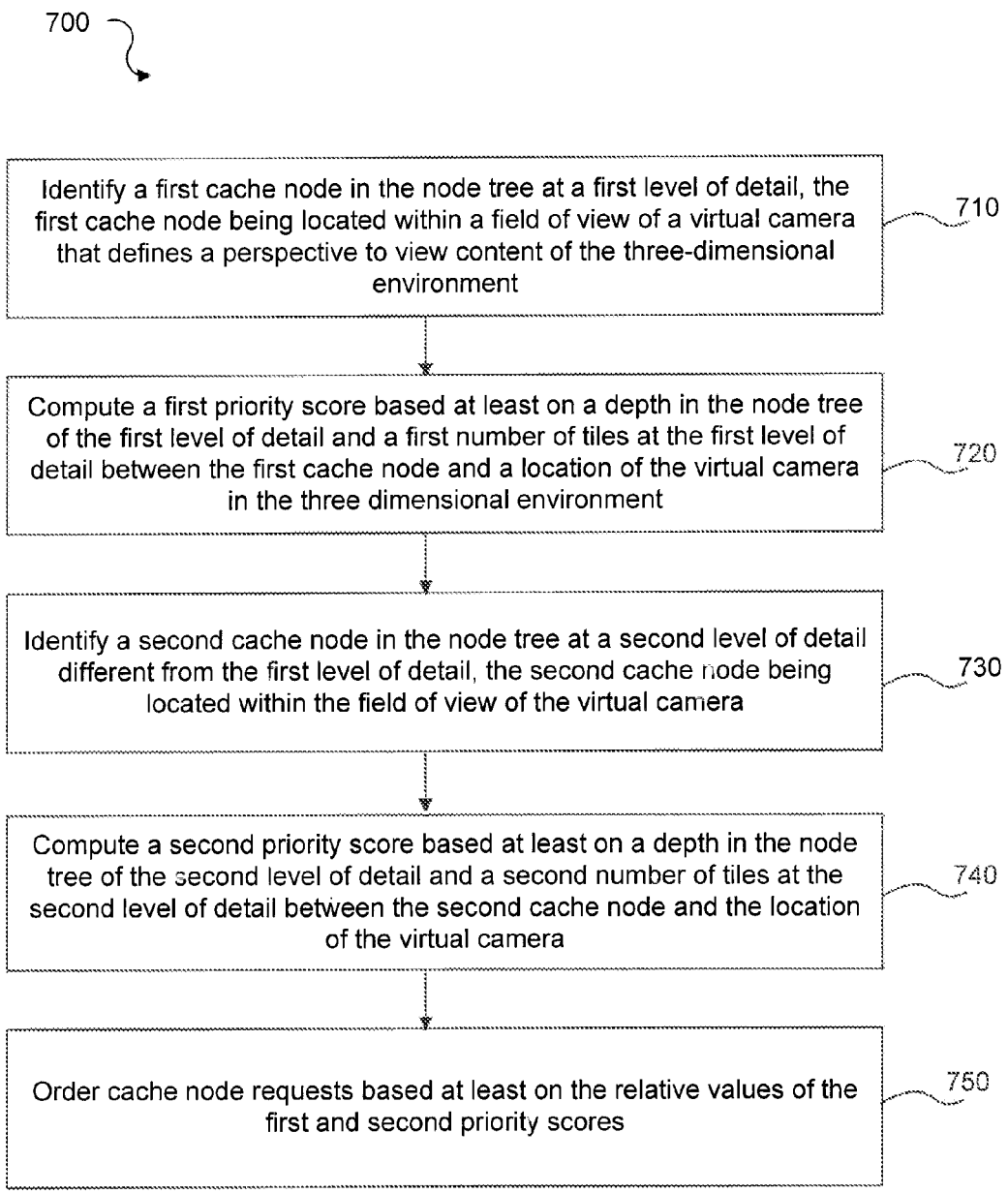
FIG. 7 shows a flowchart of a method for reducing user-perceived scene resolution time to render a node tree in a three dimensional environment, according to an embodiment.

FIG. 7 shows a flowchart of a method 700 for reducing user-perceived scene resolution time to render a node tree in a three dimensional environment, according to an embodiment. Method 700 may be used in operation of client 600 in FIG. 6. Although method 700 is described with respect to client 600, it is not meant to be limited to client 600.

At step 710, a first cache node is identified in the node tree at a first level of detail, the first cache node being located within a field of view of a virtual camera that defines a perspective to view content of the three-dimensional environment. In an embodiment, cache node identifier 642 identifies a first cache node in the node tree at a first level of detail, the first cache node being located within a field of view of a virtual camera that defines a perspective to view content of the three-dimensional environment.

At step 720, a first priority score is computed based at least on a depth in the node tree of the first level of detail and a first number of tiles at the first level of detail between the first cache node and a location of the virtual camera in the three dimensional environment. In an embodiment, priority scoring module 644 computes a first priority score based at least on a depth in the node tree of the first level of detail and a first number of tiles at the first level of detail between the first cache node and a location of the virtual camera in the three dimensional environment.

At step 730, a second cache node is identified in the node tree at a second level of detail different from the first level of detail, the second cache node being located within the field of view of the virtual camera. In an embodiment, cache node identifier 642 identifies a second cache node in the node tree at a second level of detail different from the first level of detail, the second cache node being located within the field of view of the virtual camera.

At step 740, a second priority score is computed based at least on a depth in the node tree of the second level of detail and a second number of tiles at the second level of detail between the second cache node and the location of the virtual camera. In an embodiment, priority scoring module 644 computes a second priority score based at least on a depth in the node tree of the second level of detail and a second number of tiles at the second level of detail between the second cache node and the location of the virtual camera.

At step 750, cache node requests are ordered based at least on the relative values of the first and second priority scores. In an embodiment, request sorter module 646 orders cache node requests based at least on the relative values of the first and second priority scores.

VI. Conclusion

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for reducing user-perceived scene resolution time to render a node tree in a three dimensional environment, comprising:
   (a) identifying, by one or more computing devices, a first cache node in the node tree at a first level of detail, the first cache node being located within a field of view of a virtual camera that defines a perspective to view content of the three-dimensional environment;
   (b) computing, by one or more computing devices, a first priority score based at least on a depth in the node tree of the first level of detail and a first tile distance associated with the first cache node, the first tile distance corresponding to a first number of tiles at the first level of detail between, the first cache node and a location of the virtual camera in the three-dimensional environment;

(c) identifying, by the one or more computing devices, a second cache node in the node tree at a second level of detail different from the first level of detail, the second cache node being located within the field of view of the virtual camera;

(d) computing, by the one or more computing devices, a second priority score based at least on a depth in the node tree of the second level of detail and a second tile distance associated with the second cache node, the second tile distance corresponding to a second number of tiles at the second level of detail between the second cache node and the location of the virtual camera; and (e) ordering, by the one or more computing devices, cache node requests based at least on the relative values of the first and second priority scores.

2. The method of claim 1, wherein the ordering (e) comprises
when the first priority score indicates a higher priority than the second priority score, requesting the first cache node before requesting the second cache node, and
when the second priority score indicates a higher priority than the first priority score, requesting the second cache node before requesting the first cache node.

3. The method of claim 1, further comprising streaming content of the cache nodes based at least on the relative values of the first and second priority scores.

4. The method of claim 1, wherein the computing (b) comprises computing the first priority score using the first tile distance as a primary factor and the first level of detail as a secondary factor.

5. The method of claim 1, wherein the computing (b) comprises computing the first priority score using the first level of detail as a primary factor and the first tile distance as a secondary factor.

6. The method of claim 1, further comprising:
(f) determining the first cache node is of a first type; and
(g) determining the second cache node is of a second type different from the first type,
wherein a priority function of the cache node of the first type is different from a priority function of the cache node of the second type.

7. The method of claim 6, wherein
when the first cache node is determined to be of the first type, applying a first offset to the first priority score, and
when the second cache node is determined to be of the second type, applying a second offset, different from the first offset, to the second priority score.

8. The method of claim 1, further comprising determining the first cache node is of a first type, wherein the first type is a quadtree cluster, imagery, terrain, artificial structure, or drawable type.

9. The method of claim 1, wherein the first tile distance corresponds to a geographic distance normalized to the units for the first level of detail.

10. A system for reducing user-perceived scene resolution time to render a node tree in a three dimensional environment, the system comprising:
one or more computing devices including at least one processor and associated memory, the memory storing instructions that, when implemented by the at to one processor, configure the one or more computing devices to:

(i) identify a first cache node in the node tree at a first level of detail, the first cache node being located within a field of view of a virtual camera that defines a perspective to view content of the three-dimensional environment, and (ii) identify a second cache node in the node tree at a second level of detail different from the first level of detail, the second cache node being located within the field of view of the virtual camera;

(iii) compute a first priority score based at least on a depth in the node tree of the first level of detail and a first tile distance associated with the first cache node, the first tile distance corresponding to a first number of tiles at the first level of detail between the first cache node and a location of the virtual camera in the three-dimensional environment, and (iv) compute a second priority score based at least on a depth in the node tree of the second level of detail and a second tile distance associated with the second cache node, the second tile distance corresponding to a second number of tiles at the second level of detail between the second cache node and the location of the virtual camera; and (v) order cache node requests based at least on the relative values of the first and second priority scores.

11. The system of claim 10, wherein the one or more computing devices are further configured to request cache nodes from a server based at least on the relative values of the first and second priority scores.

12. The system of claim 10, wherein the one or more computing devices are configured to compute the first priority score using the first tile distance as a primary factor and the first level of detail as a secondary factor.

13. The system of claim 10, wherein the one or more computing devices are configured to compute the first priority score using the first level of detail as a primary factor and the first the distance as a secondary factor.

14. The system of claim 10, wherein the one or more computing devices are configured to:
determine the first cache node is of a first type, and the second cache node is of a second type different from the first type, and
apply a first priority function to the cache node of the first type and apply a second priority function to the cache node of the second type, wherein the first priority function is different from the second priority function.

15. The system of claim 14, wherein the one or more computing devices are configured to
apply a first offset to the first priority score when the first cache node is determined to be of the first type, and
apply a second offset, different from the first offset, to the second priority score when the second cache node is determined to be of the second type.

16. The system of claim 10, wherein the one or more computing devices are further configured to determine the first cache node is of a first type, wherein the first type is a quadtree cluster, imagery, terrain, artificial structure, or drawable type.

17. An apparatus comprising at least one non-transitory computer readable storage medium encoding instructions thereon that, in response to execution by one or more computing devices, cause the one or more computing devices to perform operations comprising:
identifying a first cache node in the node tree at a first level of detail, the first cache node being located within a field of view of a virtual camera that defines a perspective to view content of the three-dimensional environment;

computing a first priority score based at least on a depth in the node tree of the first level of detail and a first tile distance associated with the first cache node, the first tile distance corresponding to a first number of tiles at the first level of detail between the first cache node and a location of the virtual camera in the three-dimensional environment;

identifying a second cache node in the node tree at a second level of detail different from the first level of detail, the second cache node being located within the field of view of the virtual camera;

computing a second priority score based at least on a depth in the node tree of the second level of detail and a second tile distance associated with the second cache node, the second tile distance corresponding to a second number of tiles at the second level of detail between the second cache node and the location of the virtual camera; and ordering cache node requests based at least on the relative values of the first and second priority scores.

18. The apparatus of claim 17, the operations further comprising:

when the first priority score indicates a higher priority than the second cache node, requesting the first cache node before requesting the second cache node, and when the second priority score indicates a higher priority than the first cache node, requesting the second cache node before requesting the first cache node.

19. The apparatus of claim 17, the operations further comprising:

determining the first cache node is of a first type;

determining the second cache node is of a second type different from the first type, wherein a priority function of the cache node of the first type is different from a priority function of the cache node of the second type.

20. The apparatus of claim 17, the operations further comprising:

determining a type of the first cache node;

when the first cache node is determined to be of the first type, computing the first priority score using the first tile distance as a primary factor and the first level of detail as a secondary factor; and when the first cache node is determined to be of the second type, computing the first priority score using the first level of detail as a primary factor and the first tile distance as a secondary factor.

21. The apparatus of claim 17, the operations further comprising:

determining a type of the first cache node;

when the first cache node is determined to be of the first type, applying a first offset to the first priority score; and when the first cache node is determined to be of the second type, applying a second offset, different from the first offset, to the first priority score.

22. A computer-implemented method for reducing user-perceived scene resolution time to render a node tree in a three-dimensional environment, comprising:

(a) identifying, by one or more computing devices, a first cache node in the node tree at a first level of detail, the first cache node being located within a field of view of a virtual camera that defines a perspective to view content of the three-dimensional environment;

(b) computing, by the one or more computing devices, a first priority score based at least on a first tile distance associated with the first cache node, the first tile distance corresponding to a number of tiles at the first level of detail between the first cache node and a location of the virtual camera in the three-dimensional environment;

(c) identifying, by the one or more computing devices, a second cache node in the node tree at a second level of detail different from the first level of detail, the second cache node being located within the field of view of the virtual camera;

(d) computing, by the one or more computing devices, a second priority score based at least on a second tile distance associated with the second cache node, the second tile distance corresponding to a second number of tiles at the second level of detail between the second cache node and the location of the virtual camera; and (e) ordering, by one or more computing devices, cache node requests based at least on the relative values of the first and second priority scores.

* * * * *